United States Patent
Suetsugu

(10) Patent No.: US 12,368,710 B2
(45) Date of Patent: Jul. 22, 2025

(54) AUTHENTICATION SYSTEM, AND PROGRAM

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 290 days.

(21) Appl. No.: 17/654,017

(22) Filed: Mar. 8, 2022

(65) Prior Publication Data
US 2022/0294780 A1 Sep. 15, 2022

(30) Foreign Application Priority Data
Mar. 11, 2021 (JP) ................. 2021-039635

(51) Int. Cl.
*H04L 9/40* (2022.01)
*G06F 21/32* (2013.01)

(52) U.S. Cl.
CPC .......... *H04L 63/0861* (2013.01); *G06F 21/32* (2013.01)

(58) Field of Classification Search
CPC ............................. H04L 63/0861; G06F 21/32
See application file for complete search history.

(56) References Cited

U.S. PATENT DOCUMENTS

| | | | |
|---|---|---|---|
| 9,740,820 B2 * | 8/2017 | Inoue | A61B 5/117 |
| 10,244,355 B1 * | 3/2019 | DeLuca | H04W 4/14 |
| 10,303,869 B1 * | 5/2019 | Duke | G06F 21/36 |
| 2011/0224509 A1 | 9/2011 | Fish et al. | |
| 2017/0235932 A1 * | 8/2017 | Yagi | G06F 21/32 |
| | | | 726/18 |
| 2020/0211711 A1 | 7/2020 | Kobayashi | |
| 2020/0272721 A1 * | 8/2020 | Sato | A61B 5/117 |
| 2021/0043288 A1 * | 2/2021 | Nakanishi | G16H 10/65 |

FOREIGN PATENT DOCUMENTS

| | | | |
|---|---|---|---|
| JP | 2006-336364 A | 12/2006 | |
| JP | 2010-213326 A | 9/2010 | |
| JP | 2012-203757 A | 10/2012 | |
| JP | 2013-534652 A | 9/2013 | |
| JP | 2020-109616 A | 7/2020 | |
| JP | 2020-201595 A | 12/2020 | |

OTHER PUBLICATIONS

JPO, Japanese Office Action mailed on May 18, 2021 for JP2021-039635 with English Translation, 7 pages.

* cited by examiner

*Primary Examiner* — Shanto Abedin
(74) *Attorney, Agent, or Firm* — MASUVALLEY & PARTNERS.; Peter Martinez

(57) ABSTRACT

The security of authentication is enhanced compared to when a person is authenticated using only one type of authentication. An authentication system includes authentication means configured to authenticate a person, acquisition means configured to acquire an index value related to a health state of the person, generation means configured to generate transition data indicating transition of the index value acquired by the acquisition means, determination means configured to make a determination as to whether the index value acquired by the acquisition means is normal, on the basis of the transition data generated by the generation means, and control means configured to authenticate the person using the authentication means on the basis of the determination made by the determination means.

20 Claims, 11 Drawing Sheets

(a)

(b)

AUTHENTICATION SYSTEM, AND PROGRAM

CROSS-REFERENCE TO RELATED APPLICATION

This application is based upon and claims the benefit of priorities of the prior Japanese Patent Application No. 2021-39635, filed on Mar. 11, 2021, the entire contents of which are incorporated herein by reference.

TECHNICAL FIELD

The present invention relates to an authentication technology and, in particular, to an authentication system and program that authenticate a person.

BACKGROUND ART

A program for a login authentication system is known that when data inputted to a user terminal to access a server satisfies predetermined requirements, permits login and that includes an image capture step of capturing an image of the face of a user using the camera of the user terminal, a probability value obtaining step of obtaining the possibility of identity of the user as a value by making a comparison between the captured image data and previously registered face photograph data of the user using image authentication means, a user determination step of determining whether the user whose face image has been captured is the registered user by determining whether the possibility value of identity of the user is equal to or greater than a predetermined value, and a login permission step of, when the possibility value of identity of the user is equal to or greater than the predetermined value, permitting login of the user terminal (Japanese Patent Application No. 2020-201595).

A health state determination system is also known that includes a measurement unit that measures the vital sign values of a subject, a model information generator that generates model information indicating the circadian rhythm, which is a one-day rhythm of the subject, from the vital sign values measured by the measurement unit for one day or more, and a determination unit that makes a comparison of the vital sign values measured by the measurement unit after the generation of the model information to the model information and determines whether the circadian rhythm of the subject has been disturbed, on the basis of the comparison (Japanese Unexamined Patent Application Publication No. 2020-109616).

Japanese Patent Laid-Open No. 2020-201595
Japanese Patent Laid-Open No. 2020-109616

SUMMARY OF INVENTION

An object of the present invention is to enhance the security of authentication compared to when a person is authenticated using only one type of authentication.

In order to solve the problem, according to a first aspect of the present invention, an authentication system includes authentication means configured to authenticate a person, acquisition means configured to acquire an index value related to a health state of the person, generation means configured to generate transition data indicating transition of the index value acquired by the acquisition means, determination means configured to make a determination as to whether the index value acquired by the acquisition means is normal, on the basis of the transition data generated by the generation means, and control means configured to authenticate the person using the authentication means on the basis of the determination made by the determination means.

According to a second aspect of the present invention, in the authentication system according to the first aspect of the present invention, the authentication means may perform face authentication on the person on the basis of face data acquired by scanning a face of the person.

According to a third aspect of the present invention, in the authentication system according to the first or second aspect of the present invention, the index value related to the health state of the person may be heart rate and body temperature of the person, and the determination means may determine whether the person is in a normal state by making a comparison between a normal value of the index value estimated from the transition data generated by the generation means and data at the current time point acquired by the acquisition means.

According to a fourth aspect of the present invention, the authentication system according to any one of the first to third aspects of the present invention may further include fingerprint authentication means configured to perform fingerprint authentication on the person, and even if the determination means determines that the person is in a normal state, the control means may authenticate the person using the authentication means when the fingerprint authentication means determines that the person is a previously registered person, by fingerprint authentication.

According to a fifth aspect of the present invention, the authentication system according to any one of the first to fourth aspects of the present invention may further include receiving means configured to receive GPS radio waves, location information of a device may be calculated on the basis of the GPS radio waves received by the receiving means, and if the calculated location information matches previously registered location conditions, the person may be authenticated using the authentication means.

According to a sixth aspect of the present invention, in the authentication system according to the fifth aspect of the present invention, the previously registered location conditions may be a location in which the person is authenticated and a location in which the person is not authenticated.

According to a seventh aspect of the present invention, the authentication system according to any one of the first to sixth aspects of the present invention may further include authentication detection means configured to detect a group authenticated state in which a plurality of persons including at least a first person and a second person are authenticated, and when the group authenticated state is detected by the authentication detection means, the person may be authenticated using the authentication means.

According to an eighth aspect of the present invention, in the authentication system according to the seventh aspect of the present invention, when the group authenticated state is detected within a predetermined time, the person may be authenticated using the authentication means.

In order to solve the problem, according to a ninth aspect of the present invention, a program causes a computer to perform an authentication step of authenticating a person, an acquisition step of acquiring an index value related to a health state of the person, a generation step of generating transition data indicating transition of the index value acquired in the acquisition step, a determination step of making a determination as to whether the index value acquired in the acquisition step is normal, on the basis of the transition data generated in the generation step, and a control step of authenticating the person in the authentication step on the basis of the determination made in the determination step.

According to the first aspect of the present invention, the security of authentication is enhanced compared to when the person is authenticated using only one type of authentication.

According to the second aspect of the present invention, the person is identified with a high probability.

According to the third aspect of the present invention, it is determined whether the person is in a normal state appropriate for authentication.

According to the fourth aspect of the present invention, it is checked whether the acquired index value related to the health state is that of the person.

According to the fifth or sixth aspect of the present invention, GPS authentication is performed and thus the security of authentication is further enhanced compared to when the person is authenticated using only one type of authentication.

According to the seventh or eighth aspect of the present invention, group authentication is performed and thus the security of authentication is further enhanced compared to when the person is authenticated using only one type of authentication.

According to the ninth aspect of the present invention, the security of authentication is enhanced compared to when the person is authenticated using only one type of authentication.

DESCRIPTION OF EMBODIMENTS

Figure 1:
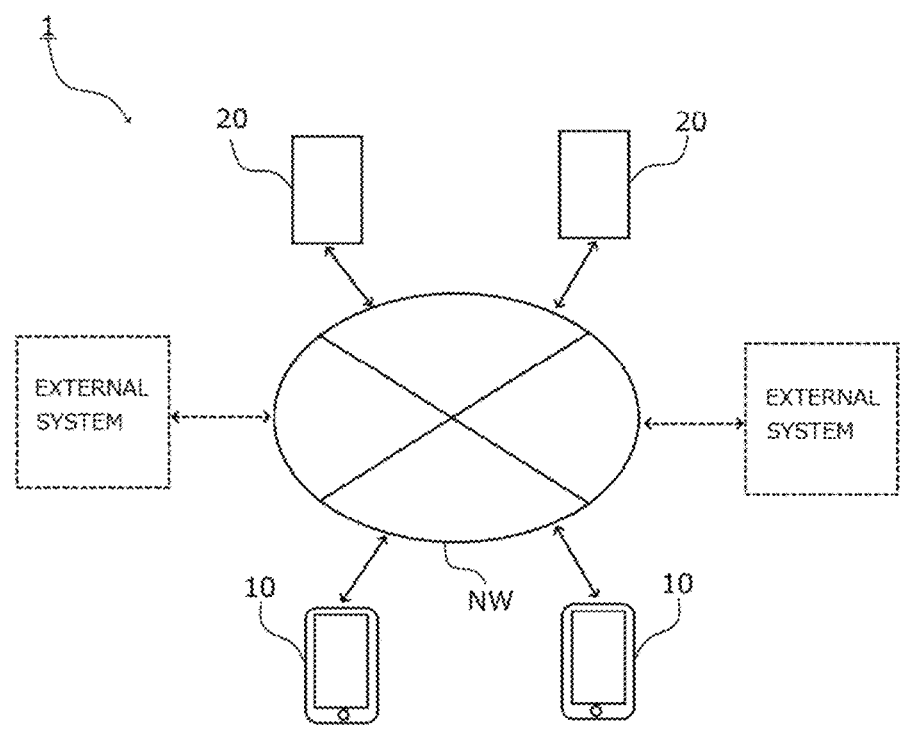
FIG. 1 is a diagram showing the overall configuration of an authentication system according to a first embodiment.

Referring now to the drawings, embodiments and specific examples of the present invention will be described in detail. However, the present invention is not limited to the embodiments or specific examples.

Also, the drawings are schematic, and elements other than those required for the description are omitted therein as appropriate to clarify the description.

First Embodiment (1) Configuration of Authentication System

Figure 2:
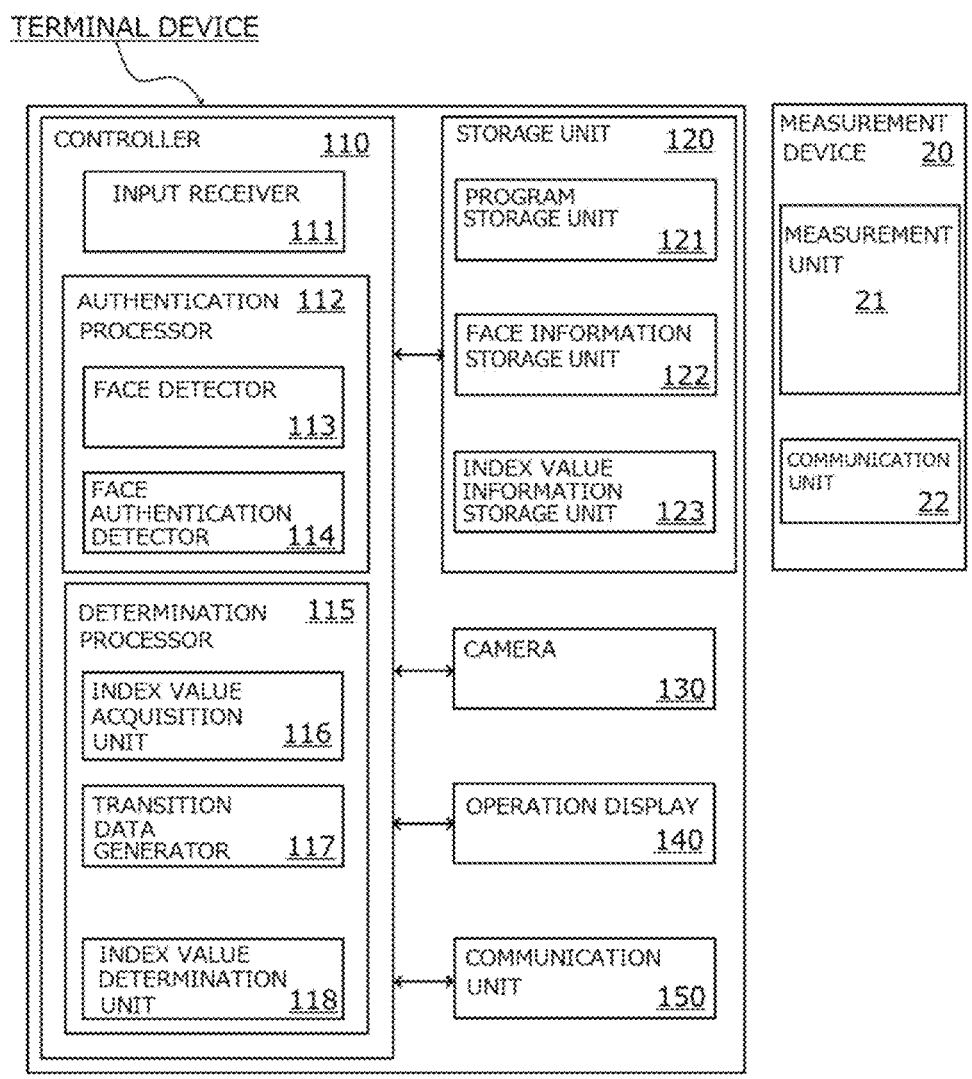
FIG. 2 is a diagram showing the functional blocks of the authentication system according to the first embodiment.

FIG. 1 is a diagram showing the overall configuration of an authentication system 1 according to a first embodiment, and FIG. 2 is a diagram showing the functional blocks of the authentication system 1 according to the present embodiment. The authentication system according to the present embodiment will be described below with reference to the diagrams.

The authentication system 1 shown in FIG. 1 is an authentication system that allows a user to log in to an external system using a terminal device 10. In particular, the authentication system 1 performs biometric authentication of a user using a face image, which is more secure authentication method, before the user performs a fund transfer transaction or uses any web service and thus allows the user to securely perform such a transaction or the like using the terminal device 10. In the present embodiment, the term "authentication" refers to verification conducted to prevent identity theft or the like in a state in which the user has already been identified.

The authentication system 1 includes terminal devices 10 and measurement devices 20 corresponding to the terminal devices 10. The terminal devices 10 are able to connect to a network NW through, for example, base stations for wireless communication (not shown). The measurement devices 20 are communicatively connected to the terminal devices 10 through the network NW. Note that the terminal devices 10 may operate stand-alone without connecting to the network NW.

The terminal devices 10 are, for example, terminals owned by persons that want to use services provided by external systems (hereafter also referred to as the "users"). The terminal devices 10 are not limited to portable devices having computer functions typified by smartphones or tablets and may be any information processing devices as long as they incorporate at least predetermined applications and are able to connect to other devices through a network. As shown in FIG. 2, each terminal device 10 includes a controller 110, a storage unit 120, a camera 130, an operation display 140, and a communication unit 150.

The controller 110 performs functions in collaboration with the storage unit 120, camera 130, operation display 140, and communication unit 150 by reading and executing an operation system or any application program stored in the storage unit 120 as necessary. The controller 110 includes an input receiver 111, an authentication processor 112, and a determination processor 115.

The input receiver 111 receives inputs made by a user to perform a transaction. For example, the input receiver 111 receives login information inputted by the user to log in to a bank server, which is an example of an external system, to perform a transaction by internet banking.

The input receiver 111 also receives selection of an authentication method. Examples of the authentication method include biometric authentication using a face image (face authentication) and authentication using a one-time password.

The authentication processor 112 performs a predetermined authentication process on the basis of the authentication method received by the input receiver 111. The authentication processor 112 includes a face detector 113 and a face authentication processor 114. The face detector 113 receives image data acquired when the user scans their face by operating the camera 130. The face detector 113 also detects the face from the received image data using face detection information stored in a face information storage unit 122 and outputs information indicating the range of the detected face or information indicating characteristics of the detected face to the face authentication processor 114. The face authentication processor 114 performs face authentication on the face detected by the face detector 113 using face reference information stored in the face information storage unit 122.

The determination processor 115 stores and manages the measured values of each of multiple index values related to the health state of the user (hereafter simply referred to as the "index values") received from a corresponding measurement device 20 as measured data consisting of the series of measured values indicating temporal changes. For example, the determination processor 115 determines the health state of the user by analyzing the stored measured data of the index values.

The determination processor 115 includes an index value acquisition unit 116, a transition data generator 117, and an index value determination unit 118. The index value acquisition unit 116 acquires the measured values of the index values indicating the health state of the user from the measurement device 20 through the communication unit 150. In the present embodiment, biological indexes such as body temperature and heart rate are used as index values. The measurement device 20 consists of, for example, a stationary or portable measurement device having a communication function, or the like. For example, the measurement device 20 includes a measurement unit 21 including a portable body temperature sensor for measuring the body temperature of a human and a portable heart rate meter provided with a microwave sensor for measuring the heart rate of a human and a communication unit 22 connected to the network NW.

The index value acquisition unit 116 acquires the measured values of the index values measured by the measurement device 20 through the communication unit 150 and stores the acquired measured values of the index values in an index value information storage unit 123. The transition data generator 117 receives the measured values of the index values from the index value acquisition unit 116 and generates transition data indicating the transition of the measured value of each index value using the measured values. The transition data is generated as, for example, data indicating changes in the measured values acquired on an hourly or daily basis.

The index value determination unit 118 determines whether the user is in a normal state by making comparisons between the normal values of the index values estimated from the transition data of the index values measured by the measurement device 20 and the measured values at the current time point acquired by the index value acquisition unit 116. For example, the index value determination unit 118 obtains, as a parameter, the difference between the normal value estimated from the transition data of heart rate and the measured value of heart rate at the current time point, the rate of change of the measured values of heart rate, or the like. When the parameter exceeds a predetermined reference value, the index value determination unit 118 determines that an abnormality or emergency is occurring in the user. Examples assumed as the abnormality or emergency in the user include a case where the user is forced to perform a fund transfer transaction by an act such as blackmail.

The storage unit 120 is the storage area of a semiconductor memory device or the like for storing programs, data, or the like required for the controller 110 to perform processes. The storage unit 120 includes a program storage unit 121, a face information storage unit 122, and an index value information storage unit 123.

The program storage unit 121 is a storage area for storing application programs and is storing applications for performing transactions with external systems, for example, a bank transaction application. The program storage unit 121 is also storing an identification API and authentication API. The face information storage unit 122 is storing face image information used for authentication. The index value information storage unit 123 is storing the measured values (measured data) of the index values measured by the measurement device 20.

The operation display 140 serves as a display for displaying information and as an input unit on which the user makes operation inputs. The operation display 140 may be a unit that receives three-dimensional operations using augmented reality (AR), virtual reality (VR), or mixed reality (MR), or operations using a three-dimensional hologram.

The communication unit 150 is a communication interface for connecting the terminal device 10 to the network NW, and the terminal device 10 is able to communicate with servers and external systems through the communication unit 150. In the present embodiment, the index value acquisition unit 116 receives the measured values of the index values indicating the health state of the user from the measurement device 20 through the communication unit 150.

(2) Operation of Authentication System

Figure 3:
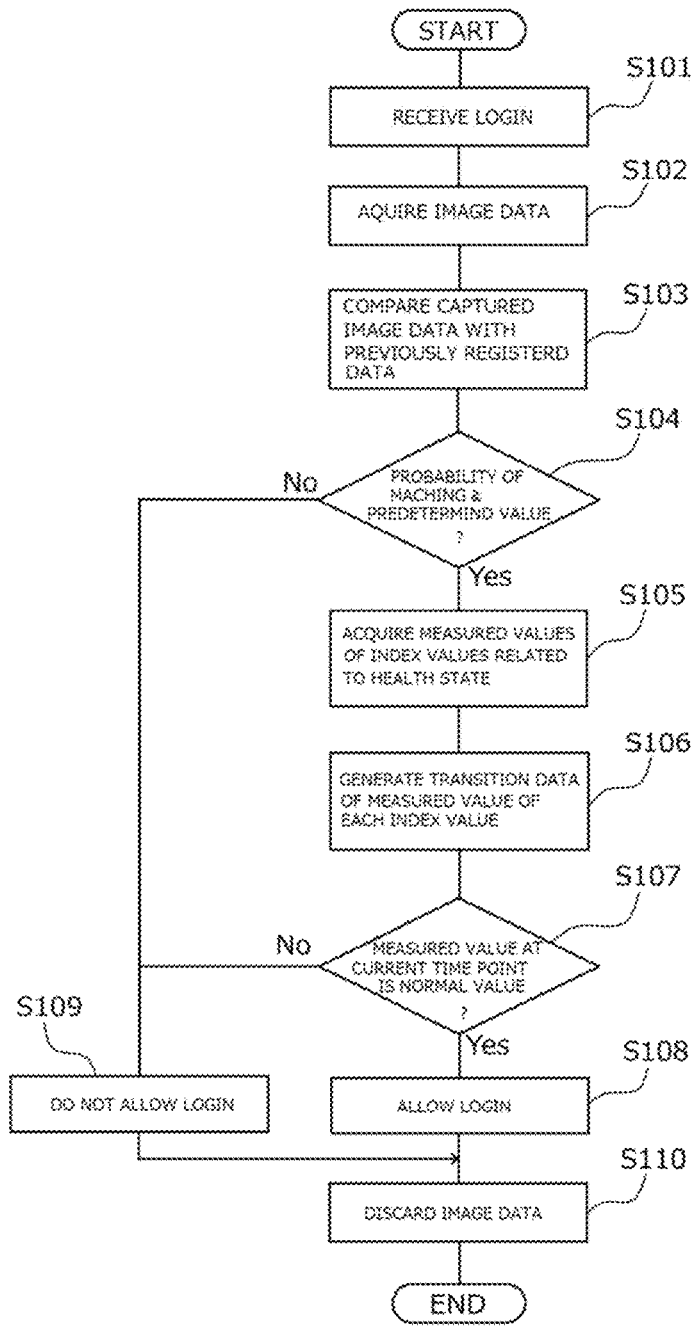
FIG. 3 is a flowchart showing the flow of an authentication process performed by the authentication system according to the first embodiment.
Figure 4:
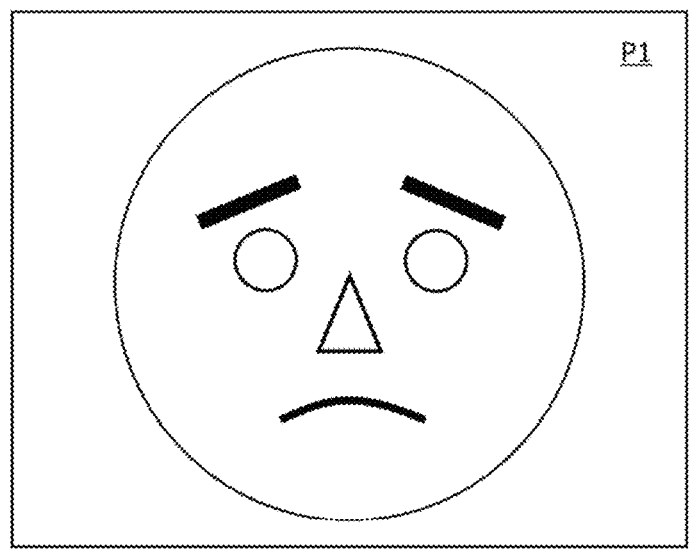
FIG. 4A is a diagram showing an example of image data of a user captured at the time of login through the authentication system.
FIG. 4B is a diagram showing an example of previously registered face photograph data of the user.
Figure 4:
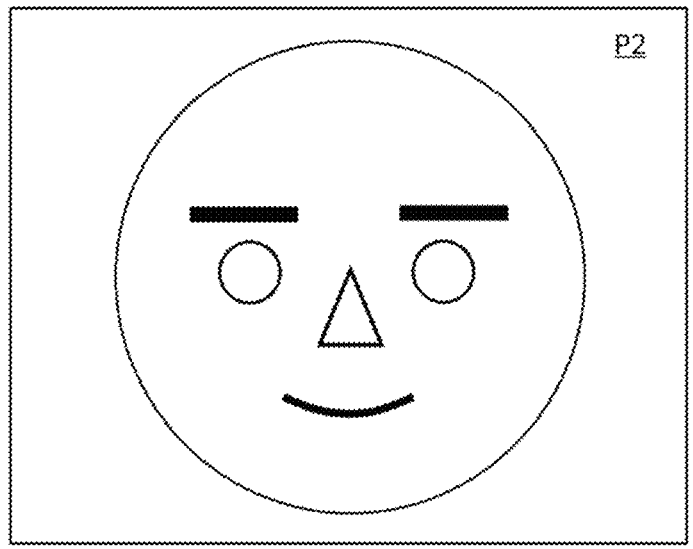

FIG. 3 is a flowchart showing the flow of an authentication process performed by the authentication system 1, FIG. 4A is a diagram showing an example of image data of the user captured at the time of login through the authentication system, and FIG. 4B is a diagram showing an example of previously registered face photograph data of the user. The operation of the authentication system 1 according to the present embodiment will be described below with reference to the flowchart.

In step S101, the controller 110 of the terminal device 10 receives login through the operation display 140. In step S102, the user starts the camera 130 and scans their face and thus the face detector 113 acquires image data P1. For example, the image data acquired represents an image including the face of the user as shown in FIG. 4A.

In step S103, the face authentication processor 114 obtains the possibility of the identity of the user as a value such as the probability of matching by making a comparison between the image data P1 (see FIG. 4A) acquired by the face detector 113 and face photograph data P2 (see FIG. 4B) of the user stored in the face information storage unit 122. At this time, for example, the face authentication processor 114 identifies the positions of the eyes, nose, mouse, and eyebrows of the face included in each image data, then identifies the shapes of the eyes, nose, mouse, and eyebrows, the contour of the face, and the like, and determines to what extent these elements are common to each other.

In step S104, the face authentication processor 114 determines whether the probability of matching calculated in step S103 is equal to or greater than a predetermined value. If it is determined that the probability of matching is equal to or greater than the predetermined value (S104: YES), the process proceeds to step S105; if it is determined that the probability of matching is not equal to or greater than the predetermined value (S104: NO), the process proceeds to S109 and login is not allowed. For example, if the value of the calculated probability of matching is "95" and the previously registered predetermined value is "90," it is determined that the user whose image has been captured is the registered user.

In step S105, the determination processor 115 acquires the measured values of the index values related to the health state of the user in order to determine the health state of the user who has been face-authenticated. In the present embodiment, the heart rate and body temperature of the user are used as the index values related to the health state of the user. The index value acquisition unit 116 acquires the measured values of the index values measured by the measurement device 20 through the communication unit 150 and stores the acquired measured values in the index value information storage unit 123 in association with the measurement date and time.

In step S106, the transition data generator 117 generates transition data indicating the transition of the measured value of each index value using the acquired measured values of the index values. The generated transition data is stored in the index value information storage unit 123.

Then, in step S107, the index value determination unit 118 determines whether the measured value of each index value at the current time point acquired in real time falls within the normal value range estimated from the transition data. For example, if the normal value of heart rate estimated from the transition data is "60 to 90 times" and the measured value at the current time point is "120 times," the index value determination unit 118 determines that the user is not in a normal state. Examples of the case in which the user is not in a normal state include a case in which the user is blackmailed by a criminal or the like. Also, heart rate is known to decrease during sleep. For example, if heart rate is equal to or smaller than "50 times," it is determined that the user is sleeping. Also, if body temperature serving as an index value does not fall within, for example, a range of "35 to 37° C.," it is determined that the user is not in a normal state.

If it is determined that the measured value of the index value at the current time point is a normal value (S107: YES), login is permitted in step S108; if it determines that the measured value of the index value at the current time point is not a normal value (S107: NO), the process proceeds to step S109 and login is not allowed. Then, in S110, the acquired image data P1 is discarded, ending the authentication process.

A program for the authentication system 1 according to the present embodiment acquired thus includes an image data acquisition step (S102) of acquiring the image data P1 of the user by scanning the face of the user using the camera 130 of the terminal device 10 of the user, a comparison step (S103) of making a comparison between the image data P1 acquired by the scanning using the camera 130 and the face photograph data P2 of the user stored in the face information storage unit 122 to obtain the possibility of the identity of the user as the probability of matching, a determination step (S104) of determining whether the probability of matching is equal to or greater than the predetermined value, a measured value acquisition step (S105) of, if the probability of matching is equal to or greater than the predetermined value, acquiring the measured values of the index values related to the health state of the user, a transition data generation step (S106) of generating transition data indicating the transition of the measured value of each index value using the acquired measured values of the index values, a determination step (S107) of determining whether the measured value of each index value at the current time point falls within the normal value range estimated from the transition data, and a login step (S108) of, if the measured value of each index value at the current time point is a normal value, permitting the user to log in to an external system. Thus, the level of authentication security is enhanced compared to when the user is authenticated using only one type of authentication.

Second Embodiment

Figure 5:
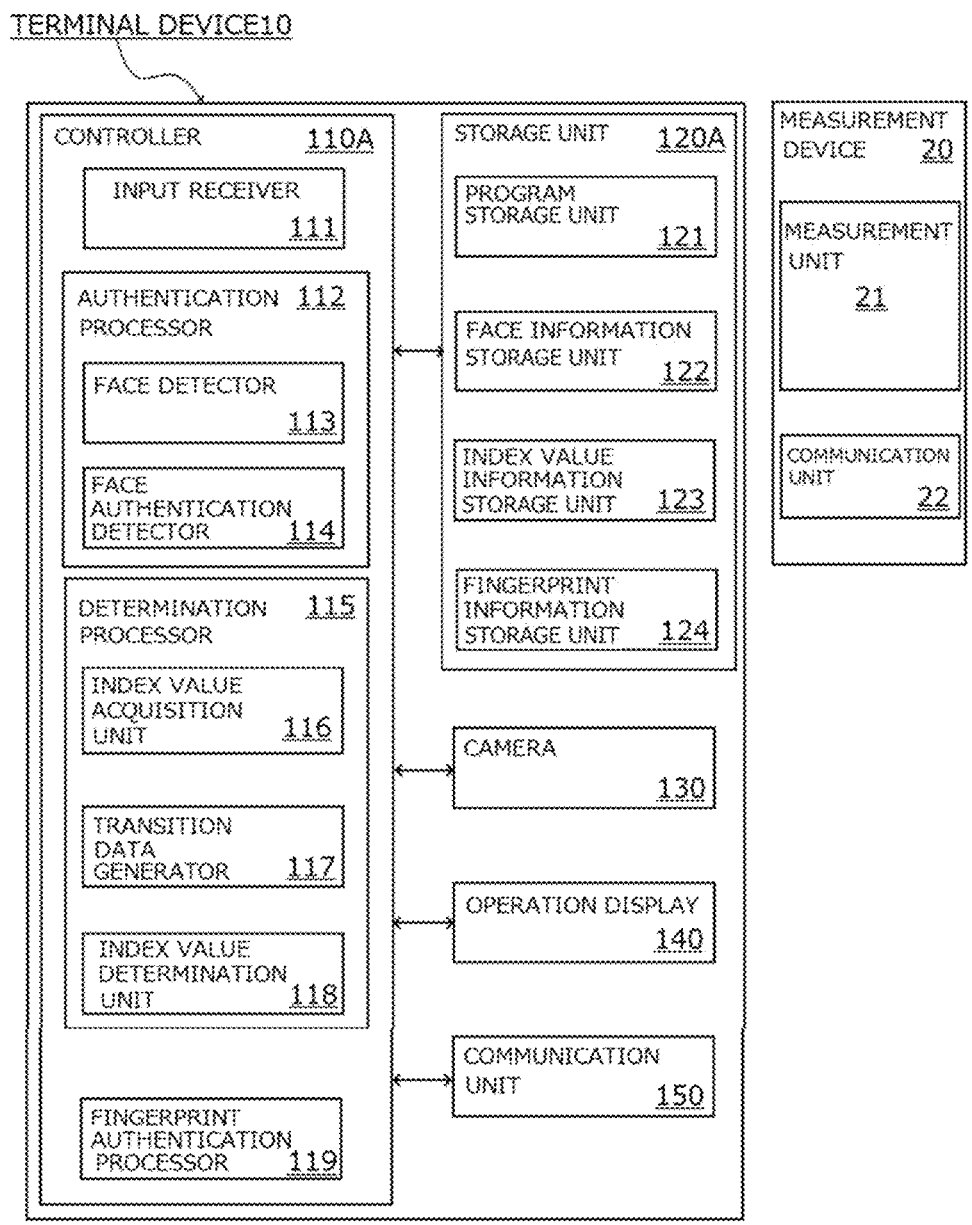
FIG. 5 is a diagram showing the functional blocks of an authentication system according to a second embodiment.

FIG. 5 is a diagram showing the functional blocks of an authentication system 1A according to a second embodiment. The authentication system 1A according to the present embodiment includes a fingerprint authentication processor serving as fingerprint authentication means that performs fingerprint authentication. The authentication system 1A differs from the authentication system 1 according to the first embodiment in that even if it is determined that a user who has been face-authenticated is in a normal state, the authentication system 1A authenticates the user by further determining that the user is a previously registered person, by fingerprint authentication. For this reason, components having the same functions as the components of the first embodiment are given the same reference signs and will not be described in detail.

(1) Configuration of Authentication System

The authentication system 1A includes terminal devices 10 and measurement devices 20 corresponding to the terminal devices 10. As shown in FIG. 5, each terminal device 10 includes a controller 110A, a storage unit 120A, a camera 130, an operation display 140, and a communication unit 150.

The controller 110A performs functions in collaboration with the storage unit 120A, camera 130, operation display 140, and communication unit 150 by reading and executing an operation system or any application program stored in the storage unit 120A as necessary. The controller 110A includes an input receiver 111, an authentication processor 112, a determination processor 115, and a fingerprint authentication processor 119.

The input receiver 111 receives inputs made by a user to execute transactions. The input receiver 111 also receives selection of an authentication method. Examples of the authentication method include biometric authentication using a face image or fingerprints and authentication using a one-time password.

The authentication processor 112 includes a face detector 113 and a face authentication processor 114. The authentication processor 112 performs a predetermined authentication process on the basis of the authentication method received by the input receiver 111. The face detector 113 receives image data acquired when the user scans their face by operating the camera 130. The face detector 113 also detects the face from the received image data using face detection information stored in a face information storage unit 122 and outputs information indicating the range of the detected face or information indicating characteristics of the detected face to the face authentication processor 114. The face authentication processor 114 performs face authentication on the face detected by the face detector 113 using face reference information stored in the face information storage unit 122.

The determination processor 115 stores and manages the measured values of each of multiple index values related to the health state of the user received from a corresponding measurement device 20 as measured data consisting of the series of measured values indicating temporal changes. For example, the determination processor 115 determines the health state of the user by analyzing the stored measured data of each index value.

The determination processor 115 includes an index value acquisition unit 116, a transition data generator 117, and an index value determination unit 118. The index value acquisition unit 116 acquires the measured values of the index values indicating the health state of the user from the measurement device 20 through the communication unit 150. In the present embodiment, biometric indexes such as body temperature and heart rate are used as index values. For example, the measurement device 20 includes a measurement unit 21 including a portable body temperature sensor for measuring the body temperature of a human and a portable heart rate meter provided with a microwave sensor for measuring the heart rate of a human and a communication unit 22 connected to the network NW. The measured values of the index values acquired by the index value acquisition unit 116 are stored in an index value information storage unit 123.

The transition data generator 117 receives the measured values of the index values from the index value acquisition unit 116 and generates transition data indicating the transition of the measured value of each index value using the measured values.

The index value determination unit 118 determines whether the user is in a normal state by making comparisons between the normal values of the index values estimated from the transition data of the index values measured by the measurement device 20 and the measured values at the current time point acquired by the index value acquisition unit 116.

The fingerprint authentication processor 119 makes a comparison between an acquired fingerprint image and fingerprint information of the user stored in a fingerprint information storage unit 124. If the characteristics of the respective fingerprints match each other, the fingerprint authentication processor 119 determines that the user is the legitimate user of the terminal device 10.

The storage unit 120A is the storage area of a semiconductor memory device or the like for storing programs, data, or the like required for the controller 110A to perform processes. The storage unit 120A includes a program storage unit 121, a face information storage unit 122, an index value information storage unit 123, and the fingerprint information storage unit 124.

The program storage unit 121 is a storage area for storing application programs and is storing applications for performing transactions with external systems, for example, a bank transaction application. The program storage unit 121 is also storing an identification API and authentication API. The face information storage unit 122 is storing face image information used for authentication. The index value information storage unit 123 is storing the measured values (measured data) of the index values measured by the measurement device 20. The fingerprint information storage unit 124 is storing fingerprint information of the user.

The operation display 140 serves as a display for displaying information and as an input unit on which the user makes operation inputs. The operation display 140 may be a unit that receives three-dimensional operations using augmented reality (AR), virtual reality (VR), or mixed reality (MR), or operations using a three-dimensional hologram.

The communication unit 150 is a communication interface for connecting the terminal device 10 to the network NW, and the terminal device 10 is able to communicate with servers and external systems through the communication unit 150. In the present embodiment, the index value acquisition unit 116 acquires the measured values of the index values indicating the health state of the user from the measurement device 20 through the communication unit 150. The fingerprint authentication processor 119 may acquire a fingerprint image from the measurement device 20 through the communication unit 150.

(2) Operation of Authentication System

Figure 6:
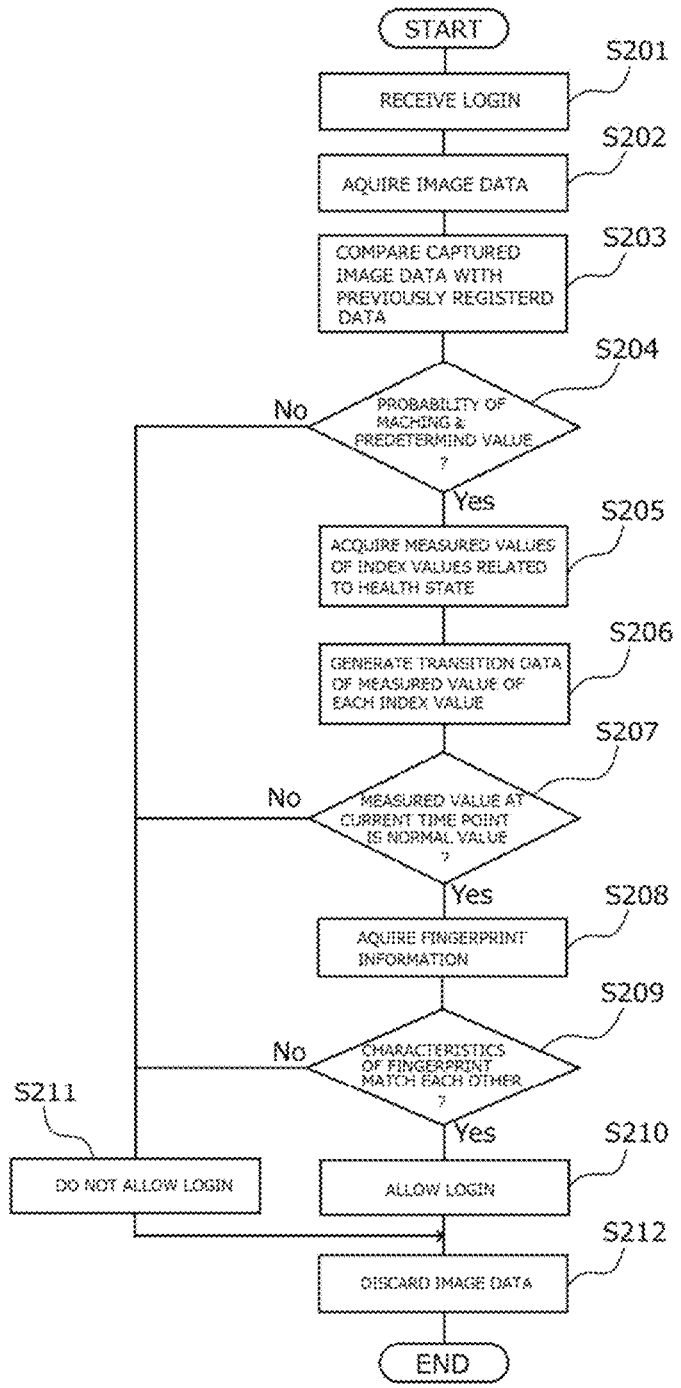
FIG. 6 is a flowchart showing the flow of an authentication process performed by the authentication system according to the second embodiment.

FIG. 6 is a flowchart showing the flow of an authentication process performed by the authentication system 1A according to the present embodiment. The operation of the authentication system 1A according to the present embodiment will be described below with reference to the flowchart.

In step S201, the controller 110A of the terminal device 10 receives login through the operation display 140. In step S202, the user starts the camera 130 and scans their face and thus the face detector 113 acquires image data P1.

In step S203, the face authentication processor 114 obtains the possibility of the identity of the user as a value such as the probability of matching by making a comparison between the image data P1 acquired by the face detector 113 and face photograph data P2 of the user stored in the face information storage unit 122.

In step S204, the face authentication processor 114 determines whether the probability of matching calculated in step S203 is equal to or greater than a predetermined value. If it is determined that the probability of matching is equal to or greater than the predetermined value (S204: YES), the process proceeds to step S205; if it is determined that the probability of matching is not equal to or greater than the predetermined value (S204: NO), the process proceeds to step S211.

In step S205, the determination processor 115 acquires the measured values of the index values related to the health state of the user in order to determine the health state of the user who has been face-authenticated. In step S206, the transition data generator 117 generates transition data indicating the transition of the measured value of each index value using the acquired measured values of the index values and stores the generated transition data in the index value information storage unit 123.

Then, in step S207, the index value determination unit 118 determines whether the measured value of each index value at the current time point acquired in real time falls within the normal value range estimated from the transition data. If it is determined that the index value at the current time point is a normal value (S207: YES), the fingerprint authentication processor 119 acquires fingerprint information in step S208. On the other hand, if it determines that the index value at the current time point is not a normal value (S207: NO), the process proceeds to step S211 and login is not allowed. The fingerprint information is acquired by a fingerprint sensor (not shown) included in the terminal device 10. If the measurement device 20 is, for example, a pulse oximeter for measuring oxygen saturation and heart rate using a finger, fingerprint information can be acquired at the same time when the measured values of the index values are acquired from the measurement device 20.

In step S209, the fingerprint authentication processor 119 performs fingerprint authentication by checking the acquired fingerprint information against the fingerprint information of the user stored in the fingerprint information storage unit 124. If these pieces of fingerprint information match each other (S209: YES), login is permitted in S210. On the other hand, if it determined that these pieces of fingerprint information do not match each other (S209: NO), the process proceeds to step S211 and login is not allowed. Then, in S212, the acquired image data P1 is discarded, ending the authentication process.

As seen above, even if it is determined that the user who has been face-authenticated is in a normal state, the authentication system 1A authenticate the user by further checking whether the index values related to the acquired health state are those of the user, by fingerprint authentication. Thus, the authentication system 1A is able to further enhance the level of authentication security.

Third Embodiment

Figure 7:
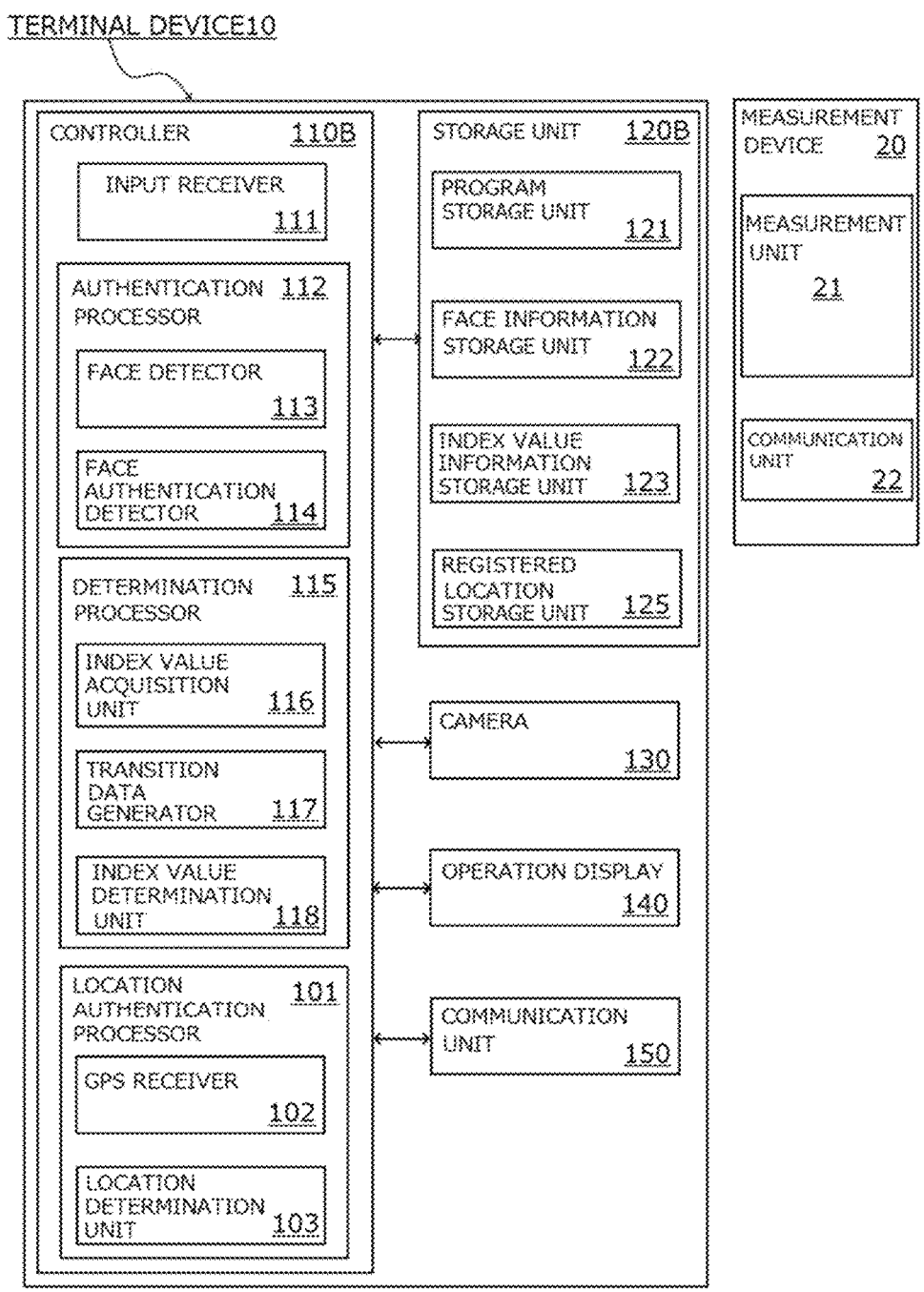
FIG. 7 is a diagram showing the functional blocks of an authentication system according to a third embodiment.

FIG. 7 is a diagram showing the functional blocks of an authentication system 1B according to a third embodiment. The authentication system 1B according to the present embodiment differs from the authentication system 1 according to the first embodiment in that the authentication system 1B includes a location authentication processor 101 that determines the location of a terminal device 10 itself and that even if it is determined that a user who has been face-authenticated is in a normal state, the authentication system 1B authenticates the user by further determining that the terminal device 10 matches previously registered location conditions, by location authentication. For this reason, components having the same functions as the components of the first embodiment are given the same reference signs and will not be described in detail.
(1) Configuration of Authentication System The authentication system 1B includes terminal devices 10 and measurement devices 20 corresponding to the terminal devices 10. As shown in FIG. 7, each terminal device 10 includes a controller 110B, a storage unit 120B, a camera 130, an operation display 140, and a communication unit 150.

The controller 110B includes an input receiver 111, an authentication processor 112, a determination processor 115, and a location authentication processor 101. The location authentication processor 101 includes a GPS receiver 102 serving as an example of receiving means and a location determination unit 103.

Figure 8:
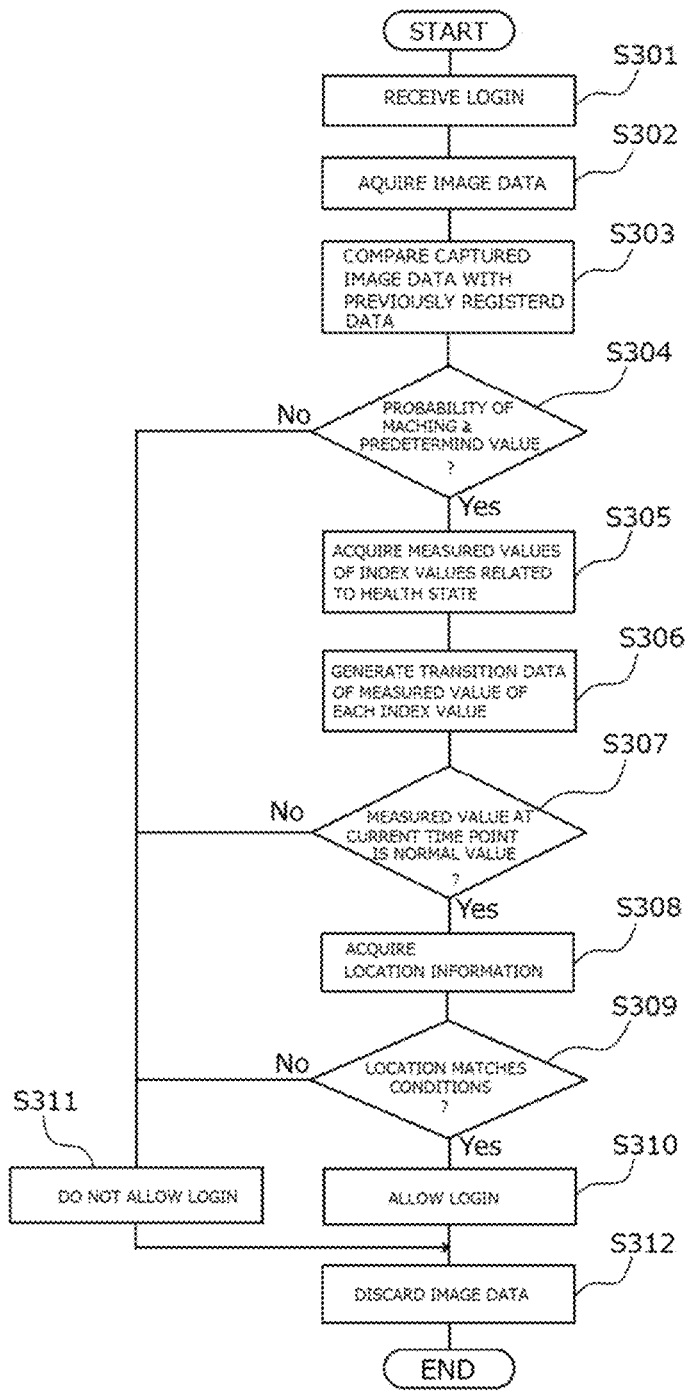
FIG. 8 is a flowchart showing the flow of an authentication process performed by the authentication system according to the third embodiment.

The GPS receiver 102 receives GPS radio waves from a global positioning system (GPS) satellite or indoor GPS. The location determination unit 103 calculates location information of the terminal device 10 as the current location of the terminal device 10 on the basis of GPS radio waves regularly received by the GPS receiver 102 and determines whether the current location of the terminal device 10 matches previously registered location conditions stored in a registered location storage unit 125. The previously registered location conditions are a location in which the user is authenticated and a location in which the user is not authenticated. If the current location does not match the previously registered location conditions, the controller 110B regards the terminal device 10 as, for example, a stolen one and does not allow login even if it is determined that the user who has been face-authenticated is in a normal state.
(2) Operation of Authentication System FIG. 8 is a flowchart showing the flow of an authentication process performed by the authentication system 1B according to the present embodiment. The operation of the authentication system 1B according to the present embodiment will be described below with reference to the flowchart.

In step S301, the controller 110B of the terminal device 10 receives login through the operation display 140. In step S302, the user starts the camera 130 and scans their face and thus a face detector 113 acquires image data P1.

In step S303, a face authentication processor 114 obtains the possibility of the identity of the user as a value such as the probability of matching by making a comparison between the image data P1 acquired by the face detector 113 and face photograph data P2 of the user stored in a face information storage unit 122.

In step S304, the face authentication processor 114 determines whether the probability of matching calculated in step S303 is equal to or greater than a predetermined value. If it is determined that the probability of matching is equal to or greater than the predetermined value (S304: YES), the process proceeds to step S305; if it is determined that the probability of matching is not equal to or greater than the predetermined value (S304: NO), the process proceeds to step S311.

In S305, the determination processor 115 acquires the measured values of index values related to the health state of the user in order to determine the health state of the user who has been face-authenticated. In step S306, a transition data generator 117 generates transition data indicating the transition of the measured value of each index value using the acquired measured values of the index values. The generated transition data is stored in an index value information storage unit 123.

Then, in step S307, an index value determination unit 118 determines whether the measured value of each index value at the current time point acquired in real time falls within the normal value range estimated from the transition data. If it is determined that the measured value at the current time point is a normal value (S307: YES), location information is acquired in step S308. The location information is acquired by receiving GPS radio waves. On the other hand, if it is determined that the measured value at the current time point is not a normal value (S307: NO), login is not allowed in S311.

In step 309, the location determination unit 103 performs location authentication by making a comparison between the acquired location information and location information stored in the registered location storage unit 125. If these pieces of location information match each other (S309: YES), login is permitted in step 310. On the other hand, if it is determined that these pieces of location information do not match each other (S309: NO), login is not allowed in S311. Then, in S312, the acquired image data P1 is discarded, ending the authentication process.

As seen above, even if it is determined that the user who has been face-authenticated is in a normal state, the authentication system 1B authenticate the user by further determining that the terminal device 10 matches the previously registered location conditions, by location authentication. Thus, the authentication system 1C is able to further enhance the level of authentication security.

Fourth Embodiment

Figure 9:
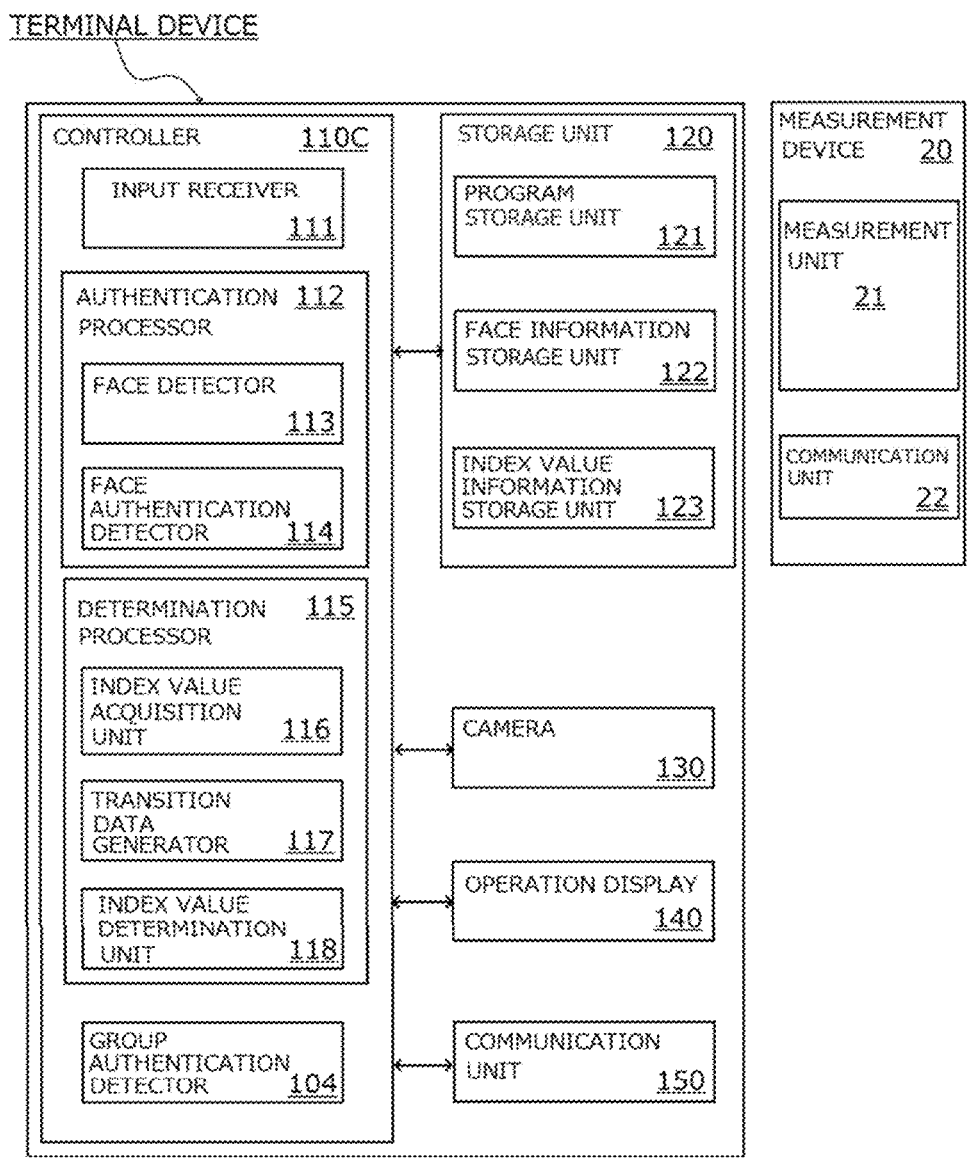
FIG. 9 is a diagram showing the functional blocks of an authentication system according to a fourth embodiment.

FIG. 9 is a diagram showing the functional blocks of an authentication system 1C according to a fourth embodiment. The authentication system 1C according to the present embodiment differs from the authentication system 1 according to the first embodiment in that the authentication system 1C includes a group authentication detector 104 serving as an example of authentication detection means that detects a group authenticated state in which multiple persons have been authenticated and that even if it is determined that a user who has been face-authenticated is in a normal state, the authentication system 1C authenticates the user by detecting a group authenticated state using the group authentication detector 104. For this reason, components having the same functions as the components of the first embodiment are given the same reference signs and will not be described in detail.

(1) Configuration of Authentication System

The authentication system 1C includes terminal devices 10 and measurement devices 20. As shown in FIG. 9, each terminal device 10 includes a controller 110C, a storage unit 120, a camera 130, an operation display 140, and a communication unit 150.

The controller 110C includes an input receiver 111, an authentication processor 112, a determination processor 115, and the group authentication detector 104. When user IDs and passwords inputted by multiple users through respective input receivers 111 match previously registered information, the group authentication detector 104 detects a group authenticated state in which the users are permitted to log in. The group authentication detector 104 also detects whether their login has been received within a predetermined time and authenticated. If a group authenticated state is not detected, the controller 110C determines that the terminal device 10 is being used by, for example, a user pretending to be the legitimate user and does not allow login even if it is determined that the user has been face-authenticated and is in a normal state.

(2) Operation of Authentication System

Figure 10:
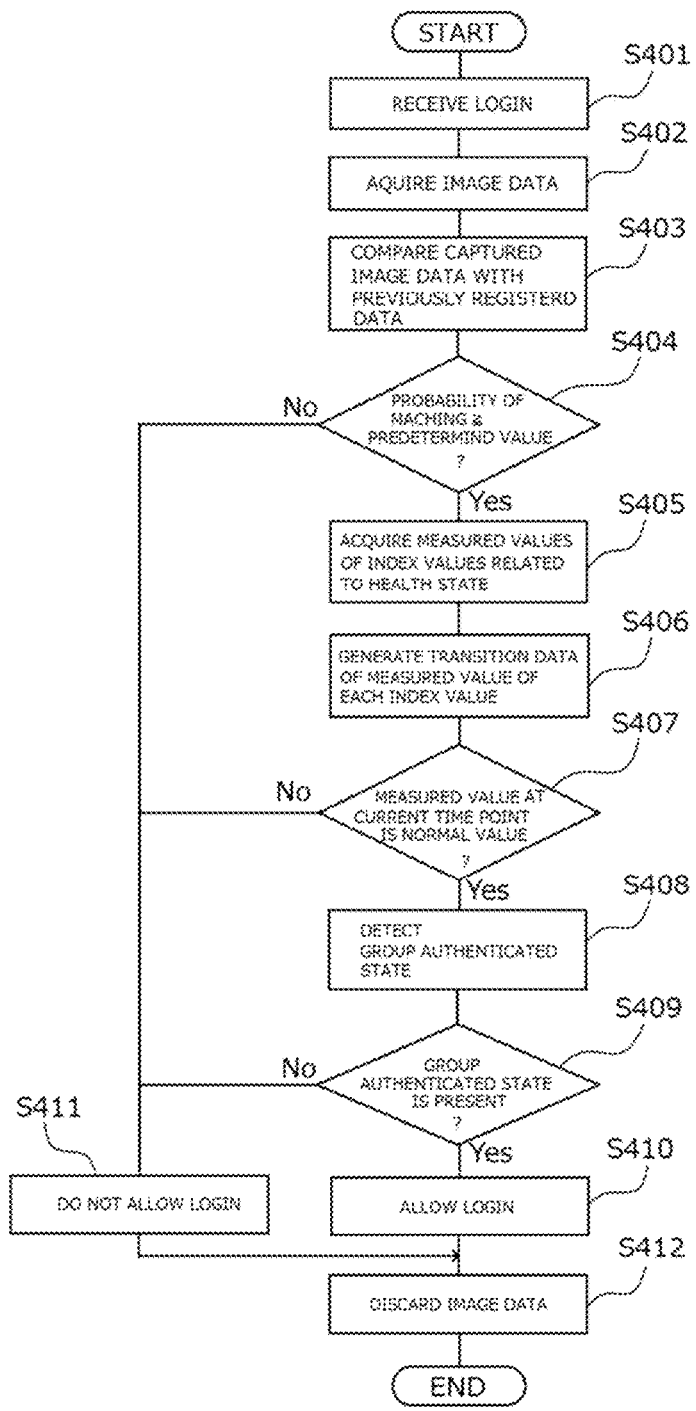
FIG. 10 is a flowchart showing the flow of an authentication process performed by the authentication system according to the fourth embodiment.

FIG. 10 is a flowchart showing the flow of an authentication process performed by the authentication system 1C according to the present embodiment. The operation of the authentication system 1C according to the present embodiment will be described below with reference to the flowchart.

In step S401, the controller 110C of the terminal device 10 receives login through an operation display 140. In step S402, the user starts the camera 130 and scans their face and thus a face detector 113 acquires image data P1.

In step S403, a face authentication processor 114 obtains the possibility of the identity of the user as a value such as the probability of matching by making a comparison between the image data P1 captured using the camera 130 and face photograph data P2 of the user stored in a face information storage unit 122. The face authentication processor 114 calculates the possibility of the identity of the user as the probability of matching by making a comparison between the image data P1 acquired by the face detector 113 and the face photograph data P2 of the user stored in the face information storage unit 122.

In step S404, the face authentication processor 114 determines whether the probability of matching calculated in step S403 is equal to or greater than a predetermined value. If it is determined that the probability of matching is equal to or greater than the predetermined value (S404: YES), the process proceeds to step S405; if it is determined that the probability of matching is not equal to or greater than the predetermined value (S404: NO), the process proceeds to step S411.

In S405, a determination processor 115 acquires the measured values of the index values related to the health state of the user in order to determine the health state of the user who has been face-authenticated. In step S406, a transition data generator 117 generates transition data indicating the transition of the measured value of each index value using the acquired measured values of the index values. The generated transition data is stored in an index value information storage unit 123.

Then, in step S407, an index value determination unit 118 determines whether the measured value of each index value at the current time point acquired in real time falls within the normal value range estimated from the transition data. If it is determined that the measured value at the current time point is a normal value (S407: YES), a group authenticated state is detected in S408. On the other hand, if it is determined that the measured value at the current time point is not a normal value (S407: NO), the process proceeds to step S411 and login is not allowed.

In step 409, the group authentication detector 104 determines whether a group authenticated state is present. Further, the group authentication detector 104 may determine whether the group authenticated state has been established within a predetermined time. If a group authenticated state is present (S409: YES), login is permitted in step S410. On the other hand, if it is determined that a group authenticated state is not present (S409: NO), login is not allowed in S411. Then, in S412, the acquired image data P1 is discarded, ending the authentication process.

As seen above, even if it is determined that the user who has been face-authenticated is in a normal state, the authentication system 1C authenticates the user by further determining that a group authenticated state is present. Thus, the authentication system 1C is able to further enhance level of authentication security.

Modification

Figure 11:
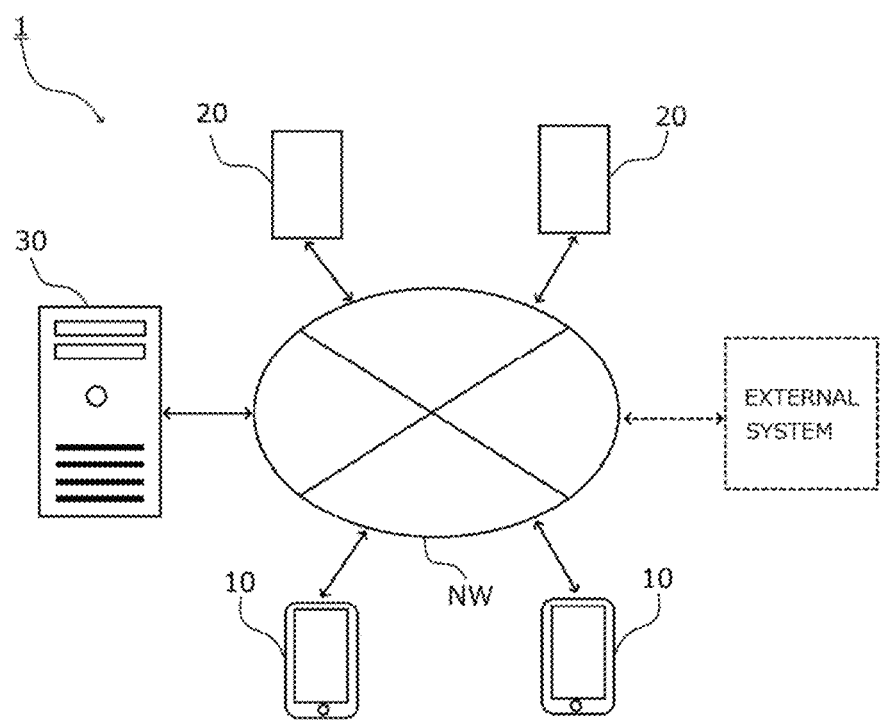
FIG. 11 is a diagram showing the overall configuration of an authentication system according to a modification.

FIG. 11 is a diagram showing the overall configuration of an authentication system 1 according to a modification. While, in the respective embodiments, the terminal device 10 of the authentication system 1, 1A, 1B, or 1C has been described as performing the face authentication process, determination process, fingerprint authentication process, location authentication process, and/or group authenticated state detection process, an authentication server 30 connected to a network NW may perform some of the authentication process, determination process, fingerprint authentication, location authentication process, and/or group authenticated state detection process, as shown in FIG. 11. Specifically, the authentication server 30 has an index value acquisition function and a transition data generation function, receives the measured values (measured data) of multiple index values measured by each measurement device 20, generates transition data indicating the transition of the measured value of each index value, and stores the generated transition data. Each terminal device 10 determines whether a user is in a normal state by acquiring the transition data through a communication unit 150 and making a comparison between the normal value of each index value estimated from the transition data and the measured value at the current time point acquired by the authentication server 30. Thus, the functions of the terminal device 10 are reduced.

DENOTATION OF REFERENCE NUMERALS 1,1A,1B,1C authentication system
10 terminal device
110,110A,110B,110C controller
101 location authentication processor
104 GROUP authentication detector
112 authentication processor
115 determination processor 119 fingerprint authentication processor
120,120A,120B storage unit
130 camera
140 operation display
150 communication unit
20 measurement device
30 authentication server

What is claimed is:

1. An authentication system comprising:
a terminal device and a measurement device;
wherein the terminal device receives selection of an authentication method;
acquires data used for an authentication and authenticates a person;
acquires a plurality of index values related to a health state of the person from the measurement device;
generates transition data indicating transition of the index value for each index value acquired from the measurement device;
makes a determination as to whether an abnormality or emergency is occurring in the person or not, by comparing the index value at a current time point acquired in real time from the measurement device with a normal value of the index value estimated from the transition data generated by the terminal device, wherein when determines that the index value at the current time point is not the normal value, the terminal device proceeds to deny a login;
authenticates the person on the basis of the determination made by the authentication method received by the terminal device; and
when the authentication is rejected, the terminal device discards the data and ends the authentication process.

2. The authentication system according to claim 1, wherein the terminal device performs face authentication on the person on the basis of face data acquired by scanning a face of the person.

3. The authentication system according to claim 1, wherein the index value related to the health state of the person is heart rate and body temperature of the person, and
wherein the terminal device determines whether the person is in a normal state by making a comparison between a normal value of the index value estimated from the transition data generated by the terminal device and data at the current time point acquired from the measurement device.

4. The authentication system according to claim 1, the terminal device further
performs fingerprint authentication on the person,
wherein even if the terminal device determines that the person is in a normal state, the terminal device authenticates the person when the terminal device determines that the person is a previously registered person, by fingerprint authentication.

5. The authentication system according to claim 1, the terminal device further
receives Global Positioning System (GPS) radio waves,
wherein location information of a device is calculated on the basis of the GPS radio waves received, and
wherein if the calculated location information matches previously registered location conditions, the person is authenticated.

6. The authentication system according to claim 5, wherein the previously registered location conditions are a location in which the person is authenticated and a location in which the person is not authenticated.

7. The authentication system according to claim 1, the terminal device further
detects a group authenticated state in which a plurality of persons including at least a first person and a second person are authenticated,
wherein when the group authenticated state is detected, the person of the group is authenticated.

8. The authentication system according to claim 7, wherein when the group authenticated state is detected within a predetermined time, the person is authenticated.

9. A non-transitory storage medium for recording a program for causing a computer to perform:
an input receive step of receiving selection of an authentication method;
an authentication step of acquiring data used for an authentication and authenticating a person;
an acquisition step of acquiring a plurality of index values related to a health state of the person;
a generation step of generating transition data indicating transition of the index value for each index value acquired in the acquisition step;
a determination step of making a determination as to whether an abnormality or emergency is occurring in the person or not, by comparing the index value at a current time point acquired in real time by terminal device with a normal value of the index value estimated from the transition data generated by the generation step, wherein when the determination step determines that the index value at the current time point is not the normal value, the determination step proceeds to deny a login;
a control step of authenticating the person in the authentication step on the basis of the determination made by the authentication method received by the input receive step; and
an ending step of discarding the data and ending the authentication process when the authentication is rejected.

10. The authentication system according to claim 2, wherein the index value related to the health state of the person is heart rate and body temperature of the person, and
wherein the terminal device determines whether the person is in a normal state by making a comparison between a normal value of the index value estimated from the transition data generated by the terminal device and data at the current time point acquired from the measurement device.

11. The authentication system according to claim 2, the terminal device further
performs fingerprint authentication on the person,
wherein even if the terminal device determines that the person is in a normal state, the terminal device authenticates the person when the terminal device determines that the person is a previously registered person, by fingerprint authentication.

12. The authentication system according to claim 3, the terminal device further
performs fingerprint authentication on the person,
wherein even if the terminal device determines that the person is in a normal state, the terminal device authenticates the person when the terminal device determines that the person is a previously registered person, by fingerprint authentication.

13. The authentication system according to claim 2, the terminal device further
receives GPS radio waves, wherein location information of a device is calculated on the basis of the GPS radio waves received, and wherein if the calculated location information matches previously registered location conditions, the person is authenticated.

14. The authentication system according to claim 3, the terminal device further receives GPS radio waves, wherein location information of a device is calculated on the basis of the GPS radio waves received, and wherein if the calculated location information matches previously registered location conditions, the person is authenticated.

15. The authentication system according to claim 4, the terminal device further receives GPS radio waves, wherein location information of a device is calculated on the basis of the GPS radio waves received, and wherein if the calculated location information matches previously registered location conditions, the person is authenticated.

16. The authentication system according to claim 2, the terminal device further detects a group authenticated state in which a plurality of persons including at least a first person and a second person are authenticated, wherein when the group authenticated state is detected, the person is authenticated.

17. The authentication system according to claim 3, the terminal device further detects a group authenticated state in which a plurality of persons including at least a first person and a second person are authenticated, wherein when the group authenticated state is detected, the person is authenticated.

18. The authentication system according to claim 4, the terminal device further detects a group authenticated state in which a plurality of persons including at least a first person and a second person are authenticated, wherein when the group authenticated state is detected, the person is authenticated.

19. The authentication system according to claim 5, the terminal device further detects a group authenticated state in which a plurality of persons including at least a first person and a second person are authenticated, wherein when the group authenticated state is detected, the person is authenticated.

20. The authentication system according to claim 6, the terminal device further detects a group authenticated state in which a plurality of persons including at least a first person and a second person are authenticated, wherein when the group authenticated state is detected, the person is authenticated.

* * * * *